(12) United States Patent
Doyen et al.

(10) Patent No.: US 8,694,922 B2
(45) Date of Patent: Apr. 8, 2014

(54) METHOD FOR DISPLAYING A SETTING MENU AND CORRESPONDING DEVICE

(75) Inventors: Didier Doyen, Cesson-Sévigné (FR); Sylvain Thiebaud, Cesson-Sévigné (FR); Thierry Borel, Cesson-Sévigné (FR)

(73) Assignee: Thomson Licensing (FR)

( * ) Notice: Subject to any disclaimer, the term of this patent is extended or adjusted under 35 U.S.C. 154(b) by 160 days.

(21) Appl. No.: 13/066,205

(22) Filed: Apr. 9, 2011

(65) Prior Publication Data

US 2011/0271235 A1 Nov. 3, 2011

(30) Foreign Application Priority Data

May 3, 2010 (FR) ...................................... 10 53394

(51) Int. Cl.
*G06F 3/033* (2013.01)
*G06F 3/048* (2013.01)

(52) U.S. Cl.
USPC .............................. 715/863; 715/835; 715/848

(58) Field of Classification Search
USPC .......................................... 715/863, 835, 848
See application file for complete search history.

(56) References Cited

U.S. PATENT DOCUMENTS

| 6,727,924 | B1 | 4/2004 | Anderson | |
|---|---|---|---|---|
| 7,439,975 | B2 * | 10/2008 | Hsu ............................... | 345/426 |
| 7,441,201 | B1 * | 10/2008 | Printezis ....................... | 715/762 |
| 7,480,873 | B2 * | 1/2009 | Kawahara ..................... | 715/848 |
| 7,512,902 | B2 * | 3/2009 | Robertson et al. ............ | 715/848 |
| 7,543,245 | B2 * | 6/2009 | Irimajiri ........................ | 715/836 |
| 7,562,312 | B2 * | 7/2009 | Rochford et al. ............. | 715/848 |
| 7,587,681 | B2 * | 9/2009 | Kake et al. .................... | 715/805 |
| 7,665,033 | B2 * | 2/2010 | Byrne et al. .................. | 715/782 |
| 7,698,658 | B2 * | 4/2010 | Ohwa et al. ................... | 715/835 |
| 7,755,608 | B2 * | 7/2010 | Chang et al. .................. | 345/157 |
| 8,037,414 | B2 * | 10/2011 | Michaelis et al. ............ | 715/729 |
| 8,279,241 | B2 * | 10/2012 | Fong ............................. | 345/661 |
| 8,381,122 | B2 * | 2/2013 | Louch et al. .................. | 715/784 |
| 2002/0008906 | A1 | 1/2002 | Tomita | |
| 2002/0126202 | A1 | 9/2002 | Wood et al. | |
| 2007/0240074 | A1 | 10/2007 | Banks | |
| 2008/0240549 | A1 | 10/2008 | Koo et al. | |

FOREIGN PATENT DOCUMENTS

| AU | 200148085 | 12/2001 |
|---|---|---|
| WO | WO2008035284 | 3/2008 |

OTHER PUBLICATIONS

French Search Report dated Dec. 22, 2010.

* cited by examiner

*Primary Examiner* — David Phantana Angkool
(74) *Attorney, Agent, or Firm* — Jack Schwartz and Associates, PLLC

(57) ABSTRACT

The invention relates to a method for displaying a settings menu. In order to optimize the graphical representation of setting carried out by a spectator, the method comprises steps for:
displaying said settings menu comprising a three-dimensional graphical element of which one of the dimensions extends according to a depth direction (z),
displaying, on said graphical element, of at least one setting representative of at least one item of depth information.

16 Claims, 6 Drawing Sheets

METHOD FOR DISPLAYING A SETTING MENU AND CORRESPONDING DEVICE

Figure 1:
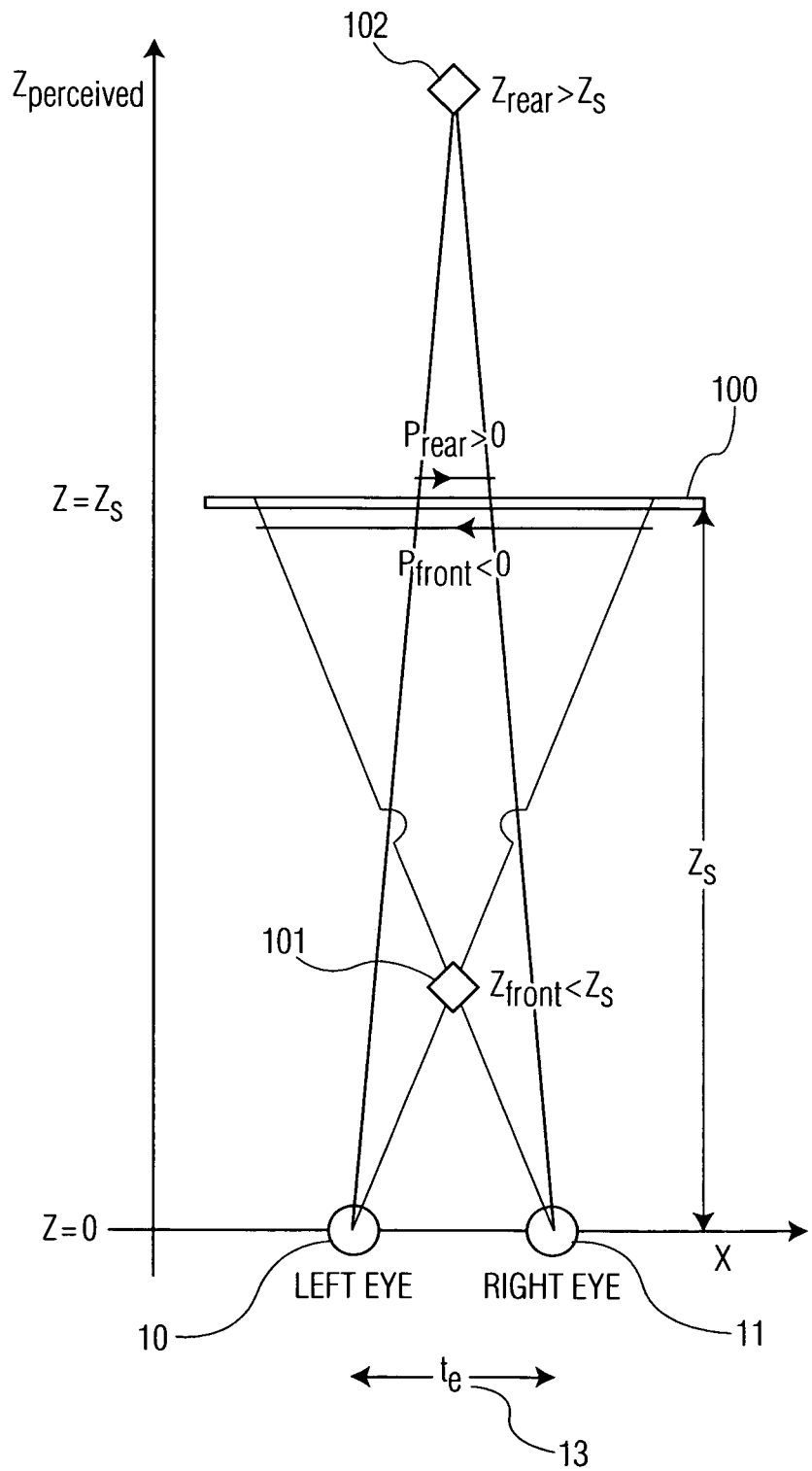

This application claims the benefit, under 35 U.S.C. §119 of FR Patent Application 1053394, filed 3 May 2010.

1. SCOPE OF THE INVENTION

The invention relates to the domain of image or video processing and more specifically to the processing of three-dimensional (3D) images and/or video. The invention also relates to the domain of image interpolation and to the domain of the setting of characteristics, associated with 3D, of images and/or video.

2. PRIOR ART

According to the prior art, there are several methods used in video processing to restore a perception of relief, for example there is stereoscopy. In stereoscopy, two views of a same scene are recorded, with two different video cameras or two different still cameras, from two different viewpoints laterally offset with respect to one another. These two views of the same scene are displayed on a display device (for example a screen of PDP (Plasma Display Panel) type, of LCD (Liquid Crystal Display) type, or by means of a video-projector) either in a temporally sequential way (left image then right image and so on) or in a spatially interlaced way (left image line then right image line and so on) to restore the perception of relief, that is to say the depth information. The amplitude of a 3D effect or the perception of a relief in a 3D image directly depends on the disparity of left and right images, that is to say on the distance (that can be measured in number of pixels for example) separating two pixels, that is to say a pixel for the left image and a pixel of the right image, representing a same item of video information at the level of the display device, that is to say representing the same element of the recorded scene. Generally, the disparity of left and right images of a film or video is set and decided by the director and corresponds to the distance between left and right cameras filming the scene, these two cameras being more often separated by a distance equal to 6.5 cm, which corresponds to the average distance separating the eyes of an individual.

The chosen distance separating the cameras corresponding to an average, the need to adapt the disparity, that is to say to adapt the amplitude of 3D effects, is felt so that each individual that views a 3D film or image is able to adapt the disparity of left and right images forming a stereoscopic 3D image to his view to avoid or diminish visual fatigue. Moreover, significant 3D effects can disturb some spectators that then try to adjust the amplitude of 3D effects, that is to say to set the depth of images. A GUI (Graphic User Interface) enabling the depth of an image to be set is known from the patent document U.S. Pat. No. 6,727,924 B1 granted Apr. 27, 2004. This GUI or this settings menu comprises a settings button moving according to a vertical direction in the image foreground moving from base to top or from top to base to set the image depth. The greater the depth setting, the more the settings menu is pressed into the image, thus giving an indication to the spectator of the intensity of the depth setting selected. The visual information relative to the depth corresponding to the setting of the depth by the spectator is not however complete, particularly for representing the overall amplitude of 3D effects, that is to say the minimum and maximum depth values selected.

3. SUMMARY OF THE INVENTION

The purpose of the invention is to overcome at least one of these disadvantages of the prior art.

More specifically, the purpose of the invention is notably to optimise the graphical representation of the settings of a spectator.

The invention relates to a method for displaying a settings menu.

The method comprises the steps for:
displaying of the settings menu comprising a three-dimensional graphical element of which one of the dimensions extends according to a depth direction,
displaying, on the graphical element, of at least one setting representative of at least one item of depth information.

According to a particular characteristic, the method comprises a step of selection of at least a part of the graphical element, the at least one part selected being associated with the at least one setting.

In a advantageous way, the method comprises a step of displaying of at least one three-dimensional image for which the depth depends on the at least one setting, the display of the at least one image being subsequent to the application of the at least one setting at the display of the graphical element.

Advantageously, the method comprises a step of displaying of at least one three-dimensional image the depth of which depends on at least one setting, the displaying of the at least one image being simultaneous with the displaying of the at least one setting.

According to a specific characteristic, the at least one setting is representative of a first item of depth information corresponding to a minimum depth of an image to be displayed and a second item of depth information corresponding to a maximum depth of the image to be displayed.

According to a particular characteristic, the at least one setting is representative of an item of depth information corresponding to the average depth of an image to be displayed.

Advantageously, the method comprises a step of analysis of a gesture of a user, the result of the analysis being interpreted to control the at least one setting.

According to another characteristic, the analysis of the gesture comprises a step of determination of the distance separating two determined parts of the physique of the user, the determined distance being associated with the at least one setting.

4. LIST OF FIGURES

Figure 2:
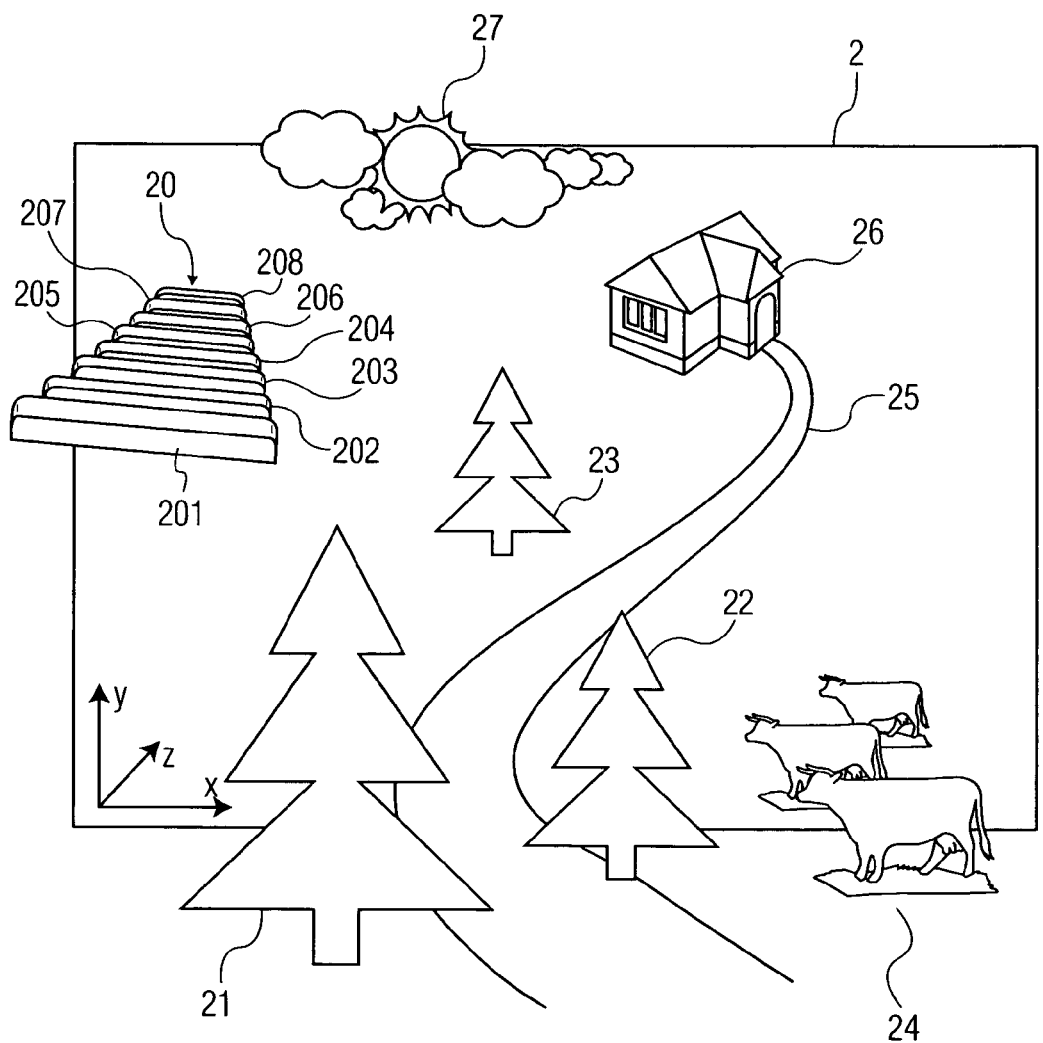
Figure 3A:
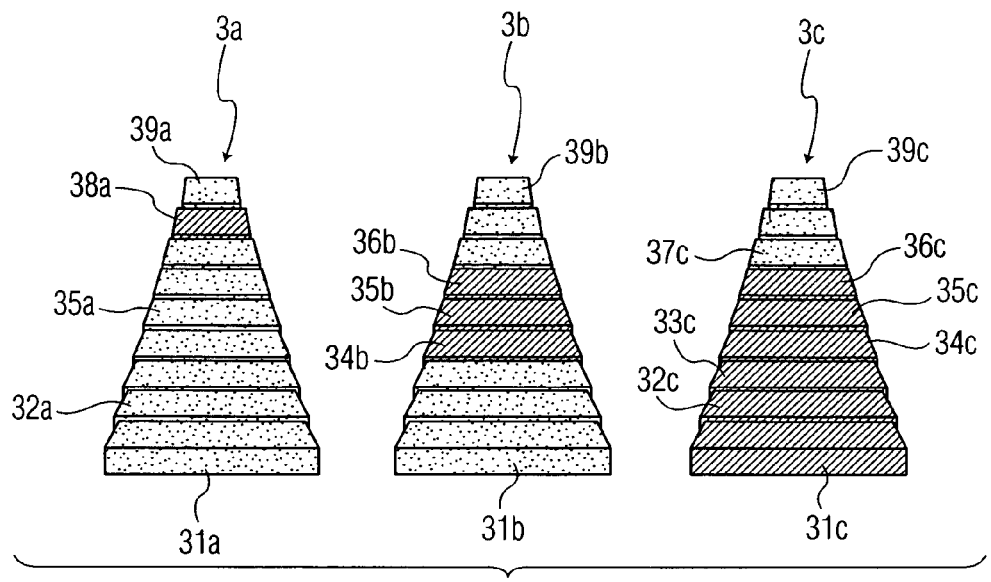
Figure 3B:
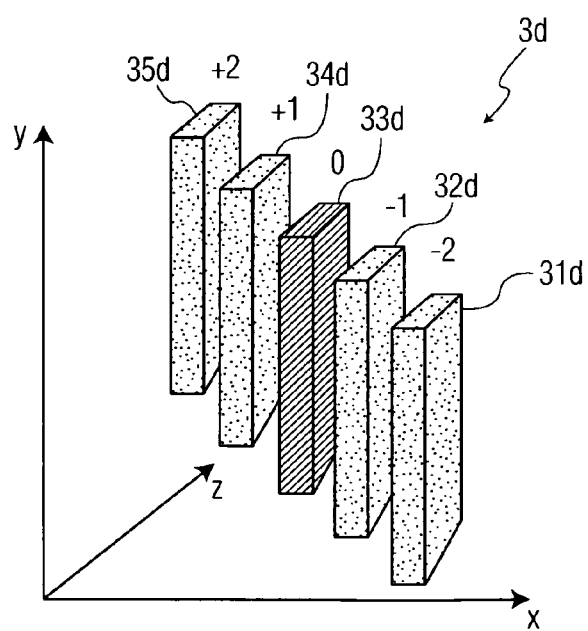
Figure 4A:
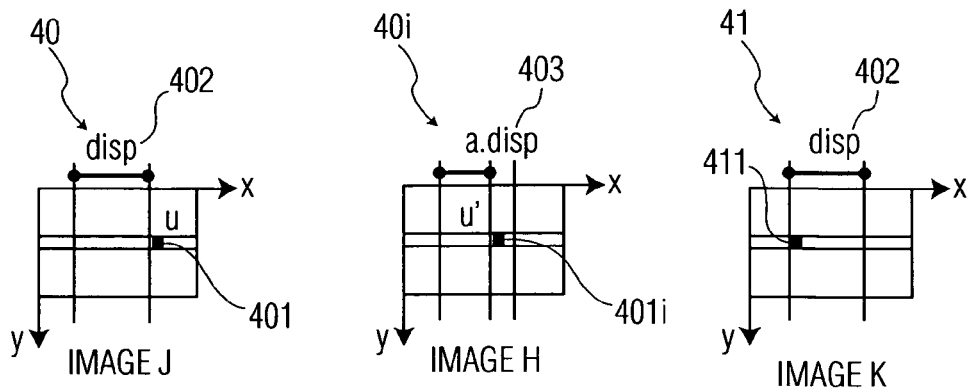
Figure 4B:
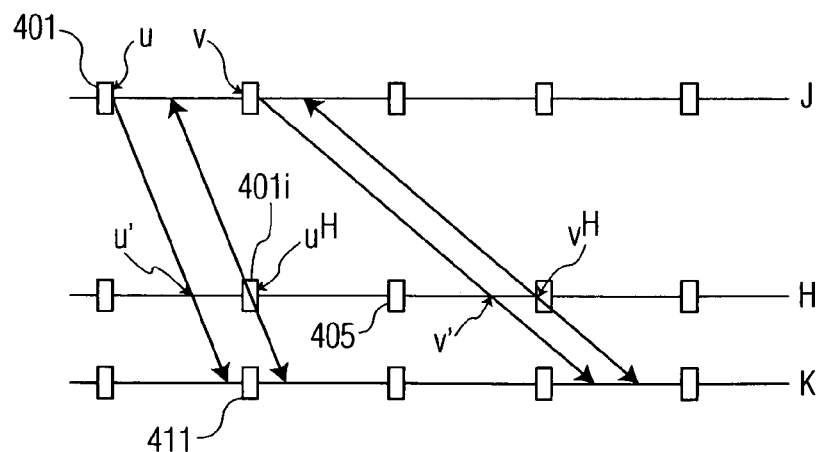
Figure 4C:
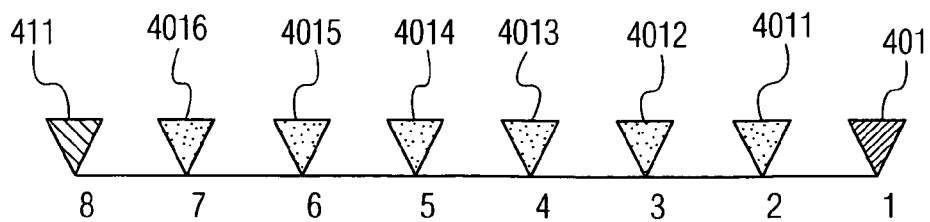
Figure 5:
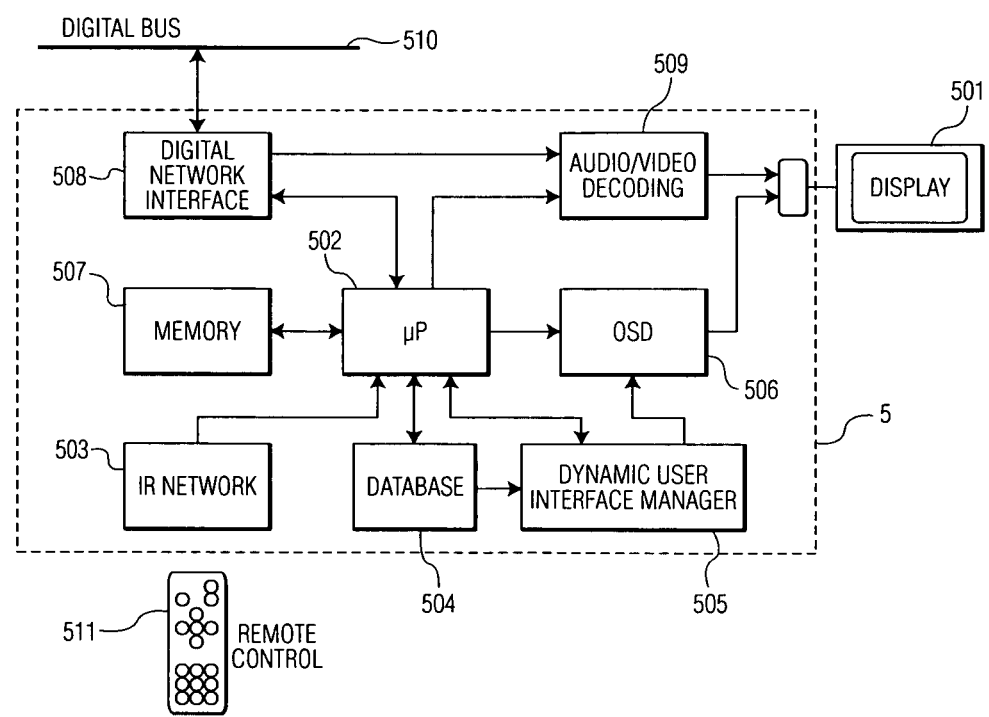
Figure 6:
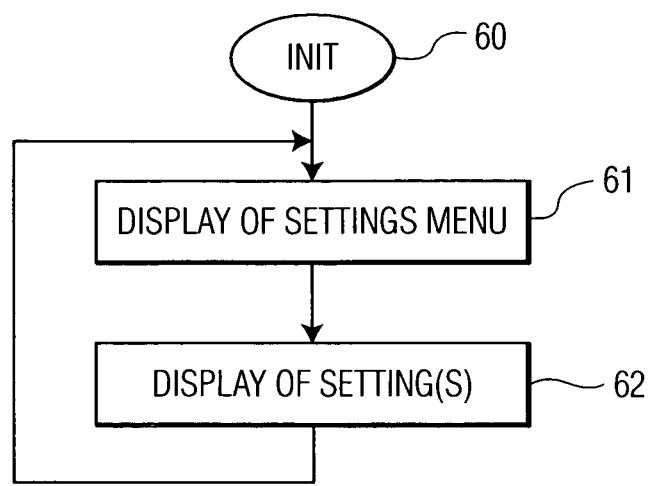
Figure 7:
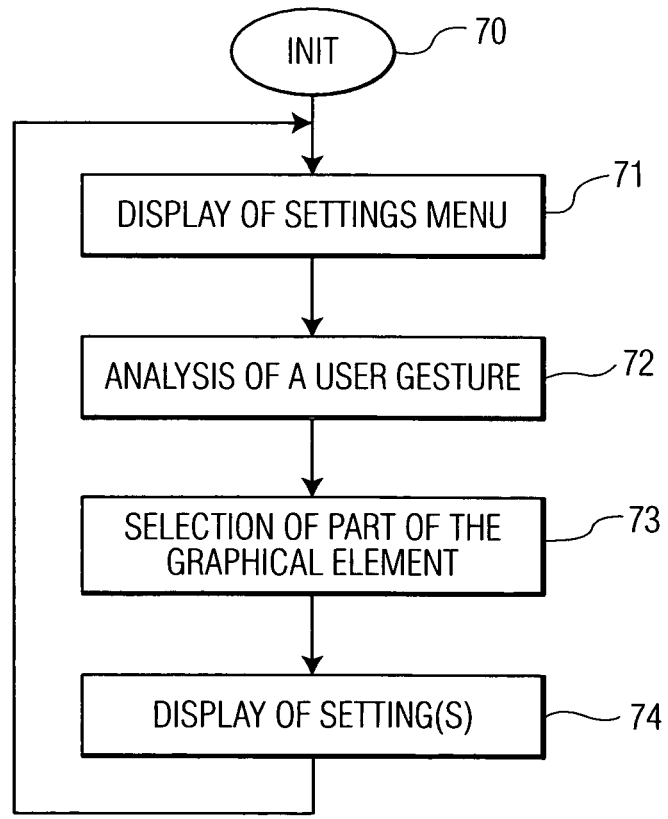

The invention will be better understood, and other specific features and advantages will emerge upon reading the following description, the description making reference to the annexed drawings wherein:

FIG. 1 shows the depth and parallax perception by a spectator, according to a particular example of the prior art, FIG. 2 shows a 3D graphical element of a settings menu in a 3D image on a display device, according to a particular embodiment of the invention, FIG. 3A shows several settings levels displayed on the 3D graphical element of FIG. 2, according to particular embodiments of the invention, FIG. 3B shows a graphical representation of a 3D graphical element of a settings menu different to that of FIG. 3A, according to a particular embodiment of the invention, FIGS. 4A to 4C show a method for interpolation of an image according to a disparity value selected by a user, according to a particular embodiment of the invention, FIG. 5 diagrammatically shows the structure of a multimedia terminal for the implementation of the invention, according to a particular embodiment of the invention, and FIGS. 6 and 7 show a method for displaying a settings menu implemented in a multimedia terminal of FIG. 5, according to two particular embodiments of the invention.

5. DETAILED DESCRIPTION OF EMBODIMENTS OF THE INVENTION

FIG. 1 shows the relationship between the depth perceived by a spectator and the parallax effect between the left and right images viewed by respectively the left eye 10 and the right eye 11 of the spectator looking at a display device or screen 100. In the case of a temporal sequential displaying left and right images representative of a same scene according to two different viewpoints (for example captured by two cameras laterally offset from one another by a distance for example equal to 6.5 cm), the spectator is equipped with active glasses for which the left eye occultation and right eye occultation are synchronized respectively with the displaying of right and left images on a display device of LCD or plasma type screen for example. Due to these glasses, the right eye of the spectator only sees the displayed right images and the left eye only sees the left images. In the case of a spatially interlaced left and right images display, the lines of left and right images are interlaced on the display device in the following manner: one line of the left image then one line of the right image (each line comprising pixels representative of the same elements of the scene filmed by the two cameras) then one line of the left image then one line of the right image and so on. In the case of a display of interlaced lines, the spectator wears passive glasses that enable the right eye to only see the right lines and the left eye to only see the left lines. In this case, the right lines will be polarized according to a first direction and the left lines according to a second direction, the left and right lenses of passive glasses being polarized as a consequence so that the left lens allows the displayed information on the left lines to pass and so that the right lens allows displayed information on the right lines to pass. FIG. 1 shows a display screen or device 100 situated at a distance or depth Zs from a spectator, or more specifically from the orthogonal plane to the viewing direction of the right eye 11 and the left eye 10 of the spectator and comprising the right and left eyes. The reference of the depth, that is to say Z=0, is formed by the eyes 10 and 11 of the spectator. Two objects 101 and 102 are viewed by the eyes of the spectator, the first object 101 being at a depth of $Z_{front}$ less than that of the screen 1 100 ($Z_{front}$<Zs) and the second object 102 at a depth $Z_{rear}$ greater than that of the screen 100 ($Z_{rear}$>Zs). In other words, the object 101 is seen in the foreground with respect to the screen 100 by the spectator and the object 102 is seen in the background with respect to the screen 100. For an object to be seen in the background with respect to the screen, the left pixels of the left image and the right pixels of the right image representing this object must have a disparity less than the distance $t_e$ 13 separating the left eye 10 and the right eye 11 of the spectator, that is to say that the position difference in X of the display of this object on the screen 100 between the left and right images is less than the distance $t_e$ 13. This position difference in X on the screen of left and right pixels representing a same object on the left and right images corresponds to the level of parallax between the left and right images. The relationship between the depth perceived by the spectator of objects displayed on the screen 100, the parallax and the distance on the screen of the spectator is expressed by the following equations:

$$Z_P = \frac{Z_s * t_e}{t_e - P} \quad \text{Equation 1}$$

$$P = \frac{W_s}{N_{col}} * d \quad \text{Equation 2}$$

in which
$Z_p$ is the perceived depth (in meters, m),
P is the parallax between the left and right images
d is the transmitted disparity information,
$t_e$ is the inter-ocular distance (m),
$Z_s$ is the distance between the spectator and the screen (m),
$W_s$ is the width of the screen (m),
$N_{col}$ is the number of columns of the display device (in pixels).

The equation 2 enables a disparity (in pixels) to be converted into parallax (in meters).

FIG. 2 shows the display of 3D settings menu inserted in a 3D image on a display device 2, according to a particular embodiment of the invention. A settings menu enables a user or a spectator, via a user interface, to set the parameters of a multimedia document of audio/video film type for example, the parameters that can be set comprising the display parameters (such as for example the brightness, the luminosity, the contrast, the image depth, etc) and/or the parameters relating to sound (such as audio volume, balance, the treble and the bass, etc.). An image, for example of stereoscopic type, representing a three-dimensional (3D) content is displayed on the display device 2 (for example a plasma or LCD screen, or a screen on which is projected the image by means of a video-projector). The image comprises three-dimensional objects 21 to 27, each of these objects being viewed by a spectator looking at the image with a given depth, that is to say a given distance from the spectator looking at these objects. The greater the distance separating the spectator from the object or objects that he sees, the greater the depth of the object or objects. The depth of objects is judged thus with respect to the spectator looking at them. Some of these objects 21, 22, 24 and 27 are seen in front of the screen 2, that is to say with a depth less than that of the screen for the spectator positioned in front of the screen 2 at a given distance from it. The object 26 representing a house is for its part seen behind the screen 2, that is to say in the background, that is to say with a depth greater than that of the screen 2. The object 23 representing a tree is seen in the foreground of the screen, that is to say with a depth equal to that of the screen 2 for a spectator looking at the image at a given distance from the screen 2. Finally, the object 25 representing a path is seen with different depths according to the spatial position of the pixels that form it. The object 25 as it is viewed by the spectator starts in the foreground of the image to end in the background at the level of the object 26, passing by the screen foreground at the level of the object 23. A graphical element 20 represented in 3 dimensions is also inserted in the image. This graphical element 20 is part of a settings menu enabling the image depth to be set, that is to say the depth of objects 21 to 27 of the image. This graphical element 20 is composed of several unitary graphical elements, for example 8 unitary graphical elements 201 to 208 each corresponding to an item of depth information, for example to a level of depth setting. In the example of FIG. 2, the unitary graphical elements (that is to say that can be selected individually, called increments in the remainder of the patent application) 203, 204 and 205 are selected and graphically highlighted, for example grey shaded. These increments 204 to 205 are representative of the setting of the depth of the image and enable a spectator to have a realistic idea of the rendering of the amplitude of the depth thus set. The graphical element 20 being represented in 3D in the depth of the image, it is easy for the spectator to take account at a glance of the impression of depth corresponding to the setting that he has set parameters for through the intermediary of the settings menu, notably through the intermediary of the graphical element 20. The 8 increments 201 to 208 correspond advantageously to the maximum amplitude of the depth that it is possible to set for the image displayed on the screen 2. Without any particular parameters of depth set by the spectator, the 3D image is displayed on the screen 2 with an initial depth level (also called default setting in the remainder of the patent application), that is to say the level of depth as provided to the screen 2, that is to say as the parameters were set at the recording of the image or in post-production by an operator.

Without introduction of a command determined by the spectator, the settings menu represented by the graphical element 20 is not displayed on the screen 2. The graphical element 20 displays on command from the user, for example by pressing a specific key of a remote control device of the display device 2, by pressing a depth settings key (for example of + and − type or of ↑ and ↓ or ← and → type), by the selection of a menu, by pronunciation of a vocal command or by detection of a gesture made by the spectator, the gesture being detected by a camera equipped for example with a depth sensor and positioned for example over the screen 2 to detect any gesture of the spectator placed in front of the screen 2.

At the introduction of the command to display the depth setting menu by the spectator, the graphical element 20 is displayed. Advantageously, the graphical element 20 is displayed at the level of an image part in which no object is present. According to a variant, the graphical element 20 is displayed in a part of the image determined by the spectator and pre-set by him. According to another variant, the graphical element is displayed in transparency on the image and does not completely mask the objects comprised in the image.

At the first displaying of the settings menu, that is to say when no setting of the depth has been carried out on the initiative of the spectator for the video that he is viewing on the screen 2, the graphical element 20 displays with the default depth setting highlighted, that is to say visually revealing the increment or increments 203 to 205 corresponding to the default depth setting. The increments 203 to 205 graphically highlighted illustrate the amplitude of the 3D effect applied to the content of the image received and displayed. The non-highlighted increments 201, 202, 206, 207 and 208 advantageously correspond to the depth settings of available and possible for the image that the spectator can select to modify the depth. The first increment 201 corresponds to the minimum value of depth (that corresponds to the minimum distance between the spectator and the image seen most in front) that it is possible to set parameters for and the increment 208 to the maximum depth value (that corresponds to the maximum distance between the spectator and the object of the image seen most in the rear) for which it is possible to set parameters for the image. According to a variant, the default setting is not displayed by the highlighting of corresponding increments but it corresponds to the minimum and maximum depth values, that is to say to the set of increments 201 to 208 of the graphical element 20.

According to this variant, the spectator can not reduce the amplitude of 3D effects, that is to say reduce the amplitude of the depth of the image around the depth of the screen, for example by constricting the depth of the image towards the front so that all the objects are seen in the foreground (that is to say essentially in front of the screen 2) or by offsetting the depth of the image toward the rear so that all the objects are seen in the background (that is to say essentially behind the screen 2).

To modify the depth setting, the spectator displays the increments corresponding to the setting that he wants to do for the depth by highlighting these increments, for example by modifying their colour. To do this, the spectator displaces for example a mobile curser over the increments and selects the increment or increments that correspond to the desired setting by introduction of a specific command (for example by pressing a particular key, for example an "OK" type key, or from a remote control or execution of a determined gesture or pronunciation of a determined sound or word, for example the work "OK" or the word "SELECTION"). Advantageously, the setting of the depth of the image dynamically modifies the parameters of the image relative to the depth and the spectator instantaneously sees the effects of his depth settings on the displayed image on the screen 2. The image is modified according to the depth setting by the generation of an image interpolated from the disparity information associated with the image. The generation of a new interpolated image is described in more detail in regard to FIGS. 4A to 4C. The setting of depth carried out by the spectator is stored in the memory and it is this setting that will be displayed when the spectator wants to again modify the depth setting.

According to a variant, the setting of the depth is first applied to the displaying of the setting menu before being applied to the image, that is to say that the display of the image with the new settings relative to the depth is subsequent to the display of the settings menu taking into account the new settings relative to the depth. According to this variant, the user can preview in a realistic way the impact of the depth settings on the graphical element of the settings menu before applying them to the image. Thus, if the settings do not correspond to what the user aims at seeing, he can change them before applying them to the image.

FIG. 3A shows several setting levels displayed on a graphical element 20, according to three embodiments of the invention. In the examples shown in FIG. 3A, the graphical element 3a, 3b and 3c (corresponding to the graphical element 20 of FIG. 2) has the form of a three-dimensional scale constituted of elementary parts 31a to 39a, 31b to 39b and 31c to 39c respectively, also called increments in the remainder of the patent application. In the example illustrated by the graphical element 3a, a single increment 38a is selected. The associated depth setting corresponds in this case to a limited amplitude of 3D effects (slight difference in depth between the objects closest to and those more distant from a spectator, with minimum and maximum depth values close to one another, for example ⅑ of the initial 3D amplitude). Considering that the increment 35a corresponds to the depth level approaching the depth of the screen foreground, a setting corresponding to the increment 38a causes the objects to shift as they are seen by a spectator into the rear of the screen, that is to say that the depth value of objects is greater than that of the screen.

In the example shown by the graphical element 3b, three increments 34b, 35b and 36b are selected. The associated depth setting corresponds in this case to a greater amplitude than that corresponding to the setting shown for the element 3a as three increments are selected. According to this example, the 3D effects are distributed around the depth of the screen (assuming that this corresponds to the increment 35b), the amplitude of the depth of the image being centred around the depth of the screen foreground. The minimum value of the depth corresponds to the increment 34b and enables objects to be seen in front of the screen (that is to say with a depth value less than that of the screen) and the maximum value of the depth corresponds to the increment 36b and enables objects to be in the rear of the screen (that is to say with a depth value greater than that of the screen). Assuming that the graphical element 3b in its entirety corresponds to the default setting of the image, the increment 31b corresponding to the minimum default depth value and the increment 39b corresponding to the maximum default value of the image, such a setting corresponds to a reduction of the amplitude of 3D effects centred around the screen foreground.

In the example illustrated by the graphical element 3c, six increments 31c to 36c are selected. The associated depth setting corresponds in this case to a greater amplitude than that corresponding to the setting shown for the elements 3a and 3b as six increments are selected. According to this example, the 3D effects are globally in front of the screen (still assuming that the screen depth corresponds to increment 35c), the depth amplitude of the image being essentially directed in front of the screen foreground. The minimum value of the depth corresponds to the increment 31c and enables objects to be seen in front of the screen (that is to say with a depth value less than that of the screen) and the maximum value of the depth corresponds to the increment 36c and enables objects to be slightly in the rear of the screen (that is to say with a depth value greater than that of the screen). Assuming that the graphical element 3c globally corresponds to the default setting of the image, the increment 31c corresponding to the minimum default depth value and the increment 39c corresponding to the maximum default depth value of the image, such a setting corresponds to a slight reduction in the amplitude of 3D effects, the effects in the rear of the screen being less important than the default setting (the increments 37c to 39c not being selected) while the effects in front of the screen correspond to the default setting (the set of increments 31c to 35c being selected).

If it is considered that the screen depth corresponds to the level of depth of increments 31a, 31b and 31c of respectively the graphical elements 3a, 3b and 3c, the possible settings only enable the objects to be shifted to the background of the screen or to keep them on the screen foreground. Conversely, if it is considered that the screen depth corresponds to the level of depth of increments 39a, 39b and 39c of respectively the graphical elements 3a, 3b and 3c, the possible settings only enable the objects to be shifted to the foreground of the screen, that is to say in the screen foreground or in front of the screen.

FIG. 3B shows a graphical representation of a 3D graphical element of a settings menu for which the general form is different to that of FIG. 3A, according to a particular embodiment of the invention. In the example of FIG. 3B, the depth setting graphical element comprises 5 rectangular parallelepipeds 31d to 35d in three dimensions extending in the direction of the depth Z towards the left. Each parallelepiped 31d to 35d corresponds to a part of the graphical element 3d, each part being associated with a given depth setting.

Naturally, the form of the graphical element is not limited to that described in regard to FIGS. 3A and 3B, that is to say to a 3D ladder form or to a series of 3D parallelepipeds, but also extends to any three-dimensional geometric form, for example a three-dimensional cylinder divided into elementary parts for example represented by three-dimensional discs or again a sphere divided into elementary parts for example represented by three-dimensional sphere slices. Likewise, the display of the selected elementary part or parts of the graphical element is not limited to a different colouration to that of the other non-selected parts but extends to all known highlighting means, for example by modification of the texture of selected parts, by making transparent the non-selected parts or again by putting into relief the selected parts.

FIGS. 4A to 4C show a method for interpolation of an image according to a disparity value selected by a user, according to a particular embodiment of the invention. The image interpolation with disparity maps consists in the interpolation of an intermediary image from one or several reference images taking into account the disparity of pixels between the images. In fact, as described in regard to FIG. 1, a stereoscopic image displayed on a screen 2 is obtained by combination of a left image and a right image, the left and right images being representative of a same scene but with two different viewpoints. The result is that a same object viewed on the left and right images appears on each of these images but with a different spatial position on each image. The captured object this appears on the right image with a position at x given and the same image appears on the left image with a position at x shifted by several pixels. This spatial shift corresponds to the disparity of the stereoscopic image resulting from the combination of right and left images, a combination made by the human brain and enabling the relief to be perceived. Thus, starting from a left reference image (or from a right reference image) of a pair of right and left reference images, it is possible to generate a new left image (respectively a new right image) by interpolation with a modified disparity. The combination of the new generated left image (or respectively the new generated right image) with the reference right image (respectively with the reference left image) enables a resulting stereoscopic image to be obtained with depth information (associated with the disparity) modified as a consequence.

The image interpolation requires the projection of the reference image (left or right) onto the interpolated image along the disparity vectors that link the left and right reference images. FIG. 4A shows two reference images J 40 and K 41, corresponding for example to the left and right images of a stereoscopic image, and an interpolated image H 40i positioned between the two images J 40 and K 41. To obtain the interpolated pixel u' 401i of the image H 40i by interpolation of the pixel u 401 of the image J 40, it is necessary to calculate the disparity map for the interpolated image H 40i by projecting the complete disparity map of the image J 40 onto the image H 40i and assign the disparity values to the pixels of the image H 40i. The calculation of the disparity map is carried out for a number of pixels representative of the image J 40 less than or equal to the total number of pixels of the image J 40. The pixel u 401 of the image J has the disparity value disp(u). The corresponding pixel 411 in the image K is defined by u−disp(u) and is located on the same line (there is no vertical displacement). The corresponding pixel in the image H is defined by u−a.disp(u), where the scale factor a is the ratio between the base lines JH and JK (obtained when the images J, H and K are aligned). The factor a is advantageously comprised between 0 and 1. FIG. 4B more precisely shows the disparity compensated interpolation of the image J to obtain the interpolated image H. u' and v' of the interpolated image H are estimated respectively from pixels u 401 and v of the image J with the disparity values of u and v, respectively disp(u) and disp(v). The points u' and v' of the image H obtained by projection of pixels u and v of the image J along the disparity vectors are respectively located at the positions u'=u−a.disp(u) and v'=v−a.disp(v). The disparity values are then assigned to the pixels closest to u' and v' in the image H, that is to say u" 401i and v" respectively. The projection of the disparity map of J onto H creates holes. In fact, some pixels of the interpolated image H are not assigned any disparity value, as is the case of the pixel 405 of FIG. 4B, the projection of pixels of the image J onto H according to the disparity vectors not encountering this pixel. This phenomenon occurs when for example there are significant variations in disparity from one pixel to another of the image J. It is then necessary to fill the holes in the reconstructed disparity map of the image, for example by spatial interpolation. Three cases present themselves. In the first case, the holes have a size less than 1 pixel and these holes are filled by averaging the disparity values of pixels that surround it on the same line. According to a variant, the holes are filled by taking the disparity value of the closest pixel on the line. In the second case, the isolated pixels, that is to say the pixels having a disparity value surrounded by pixels having no disparity value, are eliminated, that is to say that the disparity value assigned to these pixels is not taken into account. In fact, the disparity assigned to these pixels is not coherent with respect to the disparity values of neighbouring pixels and could generate visual artifacts in display. In the third case, the holes are of a size greater than 1 pixel. In this third case, it is considered that these holes correspond to an occlusion (that is to say the pixel of the image H is hidden by the pixel of the image K to which it corresponds) and the disparity of pixels of this hole and the disparity value assigned to them is the background disparity value.

Once the disparity map is obtained for the interpolated image H 40i, an inter-images interpolation (that is to say between the image J and K) is carried out along the disparity vectors to obtain the grey level values to assign to the pixels of the interpolated image H 40i. It is possible to distinguish two disparity vector types:

- the vectors that were defined by the projection of the disparity map of the image J: the grey level assigned to the pixels of the interpolated image is calculated from grey levels at the two extremity points of the vector, one belonging to the image J and the other belonging to the image K, and
- the vectors that have been spatially interpolated (that is to say for the filled holes as described above): the pixels corresponding to the interpolated image H are assumed to be occluded in the image J. These pixels are then interpolated from pixels of the image K and the grey level assigned to these pixels is calculated from grey levels of the extremity point of the vector belonging to the image K.

FIG. 4C shows an example of the interpolation of several images from two received reference images. According to the example of FIG. 4C, 6 images 4011 to 4016 are obtained by disparity compensated interpolation from at least one of the reference images 401 and 411. According to this example, the scale factor is comprised between 0 and 1, that is to say that all the interpolated images 4011 to 4016 are comprised between the reference images 401 and 411. According to this example, the maximum amplitude of the 3D effect is obtained by combining the reference images 401 and 411 and the amplitude of the 3D effect obtained by combination of a reference image 401 or 411 with an interpolated image 4011 to 4016 as all the weaker as the interpolated image is close to the reference image. The 3D effect having the lowest amplitude is obtained by combining the images 401 and 4011 or by combining the images 411 and 4016.

Naturally, the invention is not limited to the interpolation of 6 images from one at least of the reference images but also extends to the interpolation of a number x of images, for example 7, 10, 20, 50, or 100 or more images. Moreover, neither is the invention limited to the interpolation of images to produce a 3D effect of amplitude less than the amplitude of the original 3D effect (that is to say with a scale factor less than 1) but also extends to the interpolation of images to obtain a 3D effect of greater amplitude to that of the 3D effect obtained by combination of reference images (that is to say a scale factor greater than 1).

FIG. 5 diagrammatically shows the structure of a multimedia terminal 5 for the implementation of the invention, according to a particular embodiment of the invention. The terminal 5 is equipped with a display device 501. The terminal 5 comprises a central processing unit 502 connected to a program memory, and an interface 508 for communication with a high bitrate digital network 510 enabling live audio/video data to be transmitted. This network is for example a network compliant with the standard IEEE 1394. The terminal 5 also comprises an infra-red signal receiver 503 to receive signals from a remote control 511, a memory 507 for the storage of a database, and an audio/video decoding logic 509 for the creation of audiovisual signals transmitted to the display device 501. The remote control 511 is equipped with navigation keys ↑, ↓, → and ←, a numerical keypad and an "OK" key. Gyration type remote controls, equipped with motion sensors can also be used.

The terminal also comprises a data display circuit 506 on the screen, often called an OSD (On Screen Display) circuit. The OSD circuit 506 is a text and graphics generator that enables the on screen display of menus, pictograms (for example, a number corresponding to the channel displayed) and that can display the navigating menus in accordance with the present invention. The OSD circuit receives information from the central processing unit 502 and a module designed to generate the display signals of the graphical element 20.

The multimedia documents that the terminal 5 is able to reproduce are audiovisual documents, audio documents, or photos.

According to a variant, the remote control 511 is replaced by a device able to detect gestures of the spectator. The gestures are then analysed by a module, dedicated or not, of the terminal 5 to be interpreted into a navigation command on the graphical element of the settings menu. According to another variant, the remote control is replaced by a micro type device able to register a vocal command. The sounds composing the vocal command are then analysed by a module, dedicated or not, of the terminal 5 to be interpreted into a navigation command on the graphical element of the settings menu.

FIG. 6 shows a method for display of a settings menu implemented in a multimedia terminal 5, according to a first non-restrictive particularly advantageous embodiment of the invention.

During an initialisation step 60, the different parameters of the terminal are updated.

Then, during a step 61, a settings menu comprising a graphical menu having three spatial dimensions is displayed on a display device of display screen type (for example LCD or plasma) or of projection screen type. The settings menu inserts into a 3D video content or into a 3D image displayed on the display device. One of the spatial dimensions of the graphical element extends according to a depth direction, advantageously the depth direction of the 3D video content or of the 3D image displayed on the display device. Advantageously, the settings menu displays on the first command of a user input by means of a command introduction device, for example a remote control, a vocal recognition device or again a gesture recognition device. On display of the graphical element, a first timeout (of duration equal to for example 1, 2, 3, 4 or 5 seconds) is launched at the end of which, if no user action has been detected, the display of the graphical element is cleared.

Then during a step 62, a setting representative of at least one item of depth information is displayed on the graphical element. Advantageously, the setting is representative of the depth minimum value and maximum value of objects contained in the displayed 3D image. According to a variant, the setting is representative of the average depth of objects of the 3D image. Advantageously, the display of the setting is initiated by a second user command input by means of the command introduction device. On display of the setting, a second timeout (of duration equal to for example 1, 2, 3, 4 or 5 seconds) is launched at the end of which, if no user action has been detected, the display of the graphical element is cleared. The setting is advantageously representative of the amplitude of the 3D effect of the 3D video content (or the 3D image) as the parameters were set by default when the setting was not modified by the spectator (or user). By the input of a command, the spectator modifies the setting of the depth of the 3D image, the modification made to the depth setting displaying on the graphical element of the settings menu. At the expiration of the second timeout, if no user command has been detected, the setting and the graphical element of the settings menu disappears from the screen. To make the settings menu reappear, the spectator input a new first command. According to a variant, the display of the settings menu is commanded by the input of the second user command.

FIG. 7 shows a method for display of a settings menu implemented in a multimedia terminal 5, according to a second non-restrictive particularly advantageous embodiment of the invention.

During an initialisation step 70, the different parameters of the terminal are updated.

Then, during a step 71, a settings menu is displayed on a display device. This step 71 is identical to step 61 described with regard to FIG. 6 and is not further described hereafter.

Then during a step 72, the user (or the spectator) executes a particular gesture to command the setting of the depth of the 3D video content or of the 3D image that he is looking at. The gesture is for example captured by a camera equipped with a depth detector and the information recorded by the camera is analysed by a module specialized or not of the multimedia terminal to be interpreted with a view to commanding the setting of the depth of the 3D image viewed. The gesture corresponds for example to the distance between the two hands of the user. The distance separating the two hands once the movement has ended is determined by the camera and the module of the multimedia terminal, the distance separating the two hands being interpreted as corresponding to the amplitude of the 3D effect desired by the user. According to a variant, the gesture carried out by the user corresponds to a sweeping of the left hand towards the right (or right towards the left), this gesture being interpreted by the multimedia module as a command for displacement of a cursor so that this latter passes from one depth setting level to another on the graphical element of the settings menu.

Then during a step 73, a command is input by the user to select one or more parts of the graphical element, each part being associated with a particular setting level, that is to say corresponding to a depth setting level. In the case where the user commands correspond to user gestures, the selection of a part, that is to say of a setting level, is commanded by a particular gesture, for example a movement of one of the hands from up to down for example. According to a variant, the selection of one or several setting levels is commanded by any other command means, for example by pressing a key of a remote control for example the "OK" key) or by pronunciation of a vocal code (for example the word "SELECTION"). The selection of several setting levels is advantageously associated with the setting of the amplitude of the desired 3D effect, that is to say with the difference in depth or the distance between the objects of the foreground and the objects of the background as viewed by the user. In other words, the selection of several levels corresponds to a first setting representative of a first item of depth information corresponding to the minimum depth of the 3D image and to a second setting representative of a second item of depth information corresponding to the maximum depth of the 3D image, the difference between the maximum depth and the minimum depth corresponding to the amplitude of the 3D effect of the 3D image to be displayed on the display device.

Finally, during a step 74, the setting of the part or parts of the graphical element as commanded by the user is displayed as described in step 62 with regard to FIG. 6. Advantageously, the 3D image for which the depth setting is carried out by the user sees its content modified according to the setting commanded by the user. A new 3D image, corresponding to the content of the original 3D image to which was applied the setting of the user, is then displayed simultaneously with the display of the setting on the graphical element. The generation of the new 3D image is advantageously obtained by disparity compensated interpolation from one at least of the left and right images generating the 3D image by stereoscopy, the interpolated image replacing one of the reference images for the generation of the new 3D image by stereoscopy.

Naturally, the invention is not limited to the embodiments previously described.

In particular, the invention is not limited to a method for displaying a settings menu but extends to the multimedia terminal implementing such a method and to the display device comprising a multimedia terminal implementing the display method. The invention also relates to a method for image processing comprising the PIP (Picture In Picture) display of a settings menu in a 3D multimedia content.

The invention claimed is:

1. Method for displaying a settings menu, wherein the settings menu is used for setting the depth of at least one three-dimensional image, the settings menu comprising a three-dimensional graphical element, one of the dimensions of the settings menu extending according to a depth direction, wherein said method comprises steps for:
    displaying said settings menu,
    inputting of at least one setting representative of at least one item of depth information by selecting at least a part of said graphical element according to the depth direction, said at least one selected part being associated with said at least one setting, said at least a selected part of the graphical element being visually representative of the at least one setting to be applied for the displaying of the at least one three-dimensional image.

2. Method according to claim 1, wherein it comprises a step of displaying the at least one three-dimensional image for which the depth depends on said at least one setting, the application of the at least one setting to said at least one image being subsequent to the application of the at least one setting at the display of the graphical element.

3. Method according to claim 1, wherein it comprises a step of displaying the at least one three-dimensional image for which the depth depends on said at least one setting, the application of the at least one setting to said at least one image being simultaneous with the application of the at least one setting at the display of the graphical element.

4. Method according to claim 1, wherein said at least one setting is representative of a first item of depth information corresponding to a minimum depth of an image to be displayed and of a second item of depth information corresponding to a maximum depth of said image to be displayed.

5. Method according to claim 1, wherein said at least one setting is representative of an item of depth information corresponding to the average depth of an image to be displayed.

6. Method according to claim 1, wherein it comprises a step of analysis of a user gesture, the result of the analysis being interpreted to perform said inputting of said at least one setting.

7. Method according to claim 6, wherein the analysis of said gesture comprises a step of determination of the distance separating two determined parts of the physique of the user, the determined distance being associated with said at least one setting.

8. Method according to claim 1, wherein the three-dimensional graphical element comprises a plurality of unitary graphical elements displayed according to the depth direction, the plurality of unitary graphical elements being displayed as to correspond to a maximum amplitude of the depth eligible to the at least one three-dimensional image, a depth information being associated with each unitary graphical element, at least one unitary graphical element being selected among said plurality of unitary graphical elements, said at least one selected unitary graphical element being associated with the at least one setting representative of at least one depth information to be applied to the at least one three-dimensional image.

9. An apparatus for displaying a settings menu, wherein the settings menu is used for setting the depth of at least one three-dimensional image, the settings menu comprising a three-dimensional graphical element, one of the dimensions of the settings menu extending according to a depth direction, wherein the apparatus comprises:
  a data display circuit for displaying said settings menu,
  a control circuit for inputting of at least one setting representative of at least one item of depth information by selecting at least a part of said graphical element according to the depth direction, said at least one selected part being associated with said at least one setting, said at least a selected part of the graphical element being visually representative of the at least one setting to be applied for the displaying of the at least one three-dimensional image.

10. The apparatus according to claim 9, wherein the data display circuit is configured for displaying the at least one three-dimensional image for which the depth depends on said at least one setting, the application of the at least one setting to said at least one image being subsequent to the application of the at least one setting at the display of the graphical element.

11. The apparatus according to claim 9, wherein the data display circuit is configured for displaying the at least one three-dimensional image for which the depth depends on said at least one setting, the application of the at least one setting to said at least one image being simultaneous with the application of the at least one setting at the display of the graphical element.

12. The apparatus according to claim 9, wherein said at least one setting is representative of a first item of depth information corresponding to a minimum depth of an image to be displayed and of a second item of depth information corresponding to a maximum depth of said image to be displayed.

13. The apparatus according to claim 9, wherein said at least one setting is representative of an item of depth information corresponding to the average depth of an image to be displayed.

14. The apparatus according to claim 9, wherein it comprises a processor configured for analysing of a user gesture, the result of the analysis being interpreted to perform said inputting of said at least one setting.

15. The apparatus according to claim 14, wherein the processor is further configured for determining the distance separating two determined parts of the physique of the user, the determined distance being associated with said at least one setting.

16. The apparatus according to claim 9, wherein the three-dimensional graphical element comprises a plurality of unitary graphical elements displayed according to the depth direction, the plurality of unitary graphical elements being displayed as to correspond to a maximum amplitude of the depth eligible to the at least one three-dimensional image, a depth information being associated with each unitary graphical element, at least one unitary graphical element being selected among said plurality of unitary graphical elements, said at least one selected unitary graphical element being associated with the at least one setting representative of at least one depth information to be applied to the at least one three-dimensional image.

* * * * *